United States Patent
Fukushima

(10) Patent No.: US 11,416,121 B2
(45) Date of Patent: Aug. 16, 2022

(54) IMAGE PROCESSING APPARATUS, IMAGE PROCESSING METHOD, AND PROGRAM

(71) Applicant: FUJIFILM Corporation, Tokyo (JP)

(72) Inventor: Toshimitsu Fukushima, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 17/151,720

(22) Filed: Jan. 19, 2021

(65) Prior Publication Data

US 2021/0271352 A1   Sep. 2, 2021

(30) Foreign Application Priority Data

Feb. 28, 2020   (JP) .............................. JP2020-033963

(51) Int. Cl.
   *G06F 3/0482*   (2013.01)
   *G06T 11/60*    (2006.01)
   *G06T 7/00*     (2017.01)

(52) U.S. Cl.
   CPC .......... *G06F 3/0482* (2013.01); *G06T 7/0002* (2013.01); *G06T 11/60* (2013.01); *G06T 2200/24* (2013.01)

(58) Field of Classification Search
   CPC .................................................. G06F 3/0482
   See application file for complete search history.

(56) References Cited

U.S. PATENT DOCUMENTS

| | | | | |
|---|---|---|---|---|
| 8,165,406 B2* | 4/2012 | Tan | ...................... | G06K 9/6215 707/758 |
| 8,243,988 B1* | 8/2012 | Buddemeier | ........ | G06K 9/6224 382/103 |
| 8,949,252 B2* | 2/2015 | Chittar | ................ | G06F 16/5838 707/749 |
| 10,810,252 B2* | 10/2020 | Kerr | .................... | G06F 16/5838 |
| 2004/0024287 A1* | 2/2004 | Patton | ................... | A61M 21/00 600/27 |
| 2010/0235768 A1* | 9/2010 | Agevik | ............. | H04M 1/72427 715/763 |

(Continued)

FOREIGN PATENT DOCUMENTS

| | | |
|---|---|---|
| JP | 2011-049870 A | 3/2011 |
| JP | 2014-063246 A | 4/2014 |

(Continued)

*Primary Examiner* — Daniel Rodriguez
(74) *Attorney, Agent, or Firm* — Studebaker & Brackett PC

(57) ABSTRACT

Provided are an image processing apparatus, an image processing method, and a program capable of reducing user's labor in automatically creating a photo album. A plurality of candidate images are acquired, user selection information regarding a user-selected image selected by a user is acquired from the plurality of candidate images, and a user-selected image is obtained on the basis of an analysis result of the user-selected image. An attribute is given to the user-selected image, and a user selection standard that is a standard in selecting the user-selected image is estimated on the basis of a user selection ratio represented by a ratio of the number of selected images having the same attribute to a total number of user-selected images. An auto-selected image is selected from non-selected images that are not selected by the user in the candidate images on the basis of the user selection standard.

16 Claims, 17 Drawing Sheets

(56) References Cited

U.S. PATENT DOCUMENTS

| | | | |
|---|---|---|---|
| 2011/0188713 A1* | 8/2011 | Chin | G06F 16/583 |
| | | | 382/118 |
| 2014/0079324 A1* | 3/2014 | Ishige | H04N 1/00453 |
| | | | 382/224 |
| 2014/0282009 A1* | 9/2014 | Avrahami | G06F 3/04845 |
| | | | 715/730 |
| 2015/0112980 A1* | 4/2015 | Sanio | G06F 16/58 |
| | | | 707/728 |
| 2015/0169740 A1* | 6/2015 | Gunderson | G06F 16/27 |
| | | | 707/E17.082 |
| 2015/0355799 A1* | 12/2015 | Yamagishi | G06F 3/04817 |
| | | | 715/730 |
| 2016/0019416 A1* | 1/2016 | Noguchi | G06F 16/58 |
| | | | 382/190 |
| 2016/0063516 A1* | 3/2016 | Terrazas | G06V 10/56 |
| | | | 705/7.29 |
| 2017/0098152 A1* | 4/2017 | Kerr | G06N 3/02 |
| 2017/0351709 A1* | 12/2017 | Kong | G06F 16/951 |
| 2019/0095467 A1* | 3/2019 | Kislyuk | G06F 16/248 |
| 2021/0064934 A1* | 3/2021 | Swaminathan | G06K 9/627 |

FOREIGN PATENT DOCUMENTS

| | | |
|---|---|---|
| JP | 2014-174787 A | 9/2014 |
| JP | 2014-191701 A | 10/2014 |
| JP | 2016-081319 A | 5/2016 |

\* cited by examiner

FIG. 5

| FILE NAME | ATTRIBUTE | | | | |
|---|---|---|---|---|---|
| | OBJECT DETERMINATION RESULT | DEGREE OF BLURRING /CAMERA-SHAKE | DEGREE OF BRIGHTNESS | COLOR | PERSON |
| 0001.xxx | FOOD | 80 | 90 | 85 | — |
| 0002.xxx | LANDSCAPE | 90 | 70 | 60 | PERSON A, PERSON B |
| 0003.xxx | FOOD | 90 | 85 | 80 | — |
| 0004.xxx | PERSON | 70 | 60 | 85 | PERSON A |
| 0005.xxx | FOOD | 85 | 80 | 70 | — |

| FILE NAME | ATTRIBUTE | | | | | STANDARD SCORE |
|---|---|---|---|---|---|---|
| | OBJECT DETERMINATION RESULT | DEGREE OF BLURRING /CAMERA-SHAKE | DEGREE OF BRIGHTNESS | COLOR | PERSON | |
| 0010.xxx | PERSON | 60 | 60 | 85 | PERSON A (+100) | 305 |
| 0011.xxx | FOOD | 50 | 70 | 60 | - | 180 |
| 0012.xxx | PET | 50 | 50 | 70 | - | 170 |
| 0013.xxx | LANDSCAPE | 90 | 90 | 90 | PERSON A, PERSON B (+200) | 470 |
| 0014.xxx | LANDSCAPE | 85 | 80 | 90 | - | 255 |
| .... | .... | .... | .... | .... | .... | .... |

| FILE NAME | ATTRIBUTE ||||| ADJUSTED SCORE |
|---|---|---|---|---|---|---|
| | OBJECT DETERMINATION RESULT | DEGREE OF BLURRING /CAMERA-SHAKE | DEGREE OF BRIGHTNESS | COLOR | PERSON | |
| 0010.xxx | PERSON | 60 | 60 | 85 | PERSON A (+100) | 305 |
| 0011.xxx | FOOD (+300) | 50 | 70 | 60 | - | 480 |
| 0012.xxx | PET | 50 | 50 | 70 | - | 170 |
| 0013.xxx | LANDSCAPE | 90 | 90 | 90 | PERSON A, PERSON B (+200) | 470 |
| 0014.xxx | LANDSCAPE | 85 | 80 | 90 | - | 255 |
| ⋯ | ⋯ | ⋯ | ⋯ | ⋯ | ⋯ | ⋯ |

| FILE NAME | OBJECT DETERMINATION RESULT | ATTRIBUTE ||||| ADJUSTED SCORE |
| --- | --- | --- | --- | --- | --- | --- |
| | | DEGREE OF BLURRING /CAMERA-SHAKE | DEGREE OF BRIGHTNESS | COLOR | PERSON | |
| 0010.xxx | PERSON | 60 | 60 | 85 | PERSON A (+100 +300) | 605 |
| 0011.xxx | FOOD | 50 | 70 | 60 | - | 180 |
| 0012.xxx | PET | 50 | 50 | 70 | - | 170 |
| 0013.xxx | LANDSCAPE | 90 | 90 | 90 | PERSON A, PERSON B (+200 +300) | 770 |
| 0014.xxx | LANDSCAPE | 85 | 80 | 90 | - | 255 |
| ... | ... | ... | ... | ... | ... | ... |

| FILE NAME | OBJECT DETERMINATION RESULT | ATTRIBUTE | | | |
|---|---|---|---|---|---|
| | | DEGREE OF BLURRING /CAMERA-SHAKE | DEGREE OF BRIGHTNESS | COLOR | PERSON |
| 0010.xxx | LANDSCAPE | 70 | 80 | 85 | - |
| 0011.xxx | FOOD | 80 | 60 | 60 | PERSON C, PERSON D |
| 0012.xxx | LANDSCAPE | 80 | 75 | 80 | - |
| 0013.xxx | PERSON | 60 | 50 | 85 | PERSON C |
| 0014.xxx | LANDSCAPE | 75 | 70 | 70 | - |

| FILE NAME | ATTRIBUTE | | | | | STANDARD SCORE |
|---|---|---|---|---|---|---|
| | OBJECT DETERMINATION RESULT | DEGREE OF BLURRING /CAMERA-SHAKE | DEGREE OF BRIGHTNESS | COLOR | PERSON | |
| 0010.xxx | PERSON | 60 | 60 | 85 | PERSON A (+100) | 305 |
| 0011.xxx | FOOD | 85 | 80 | 90 | - | 255 |
| 0012.xxx | PET | 50 | 50 | 70 | - | 170 |
| 0013.xxx | LANDSCAPE | 90 | 90 | 90 | PERSON A, PERSON B (+200) | 470 |
| 0014.xxx | LANDSCAPE | 50 | 70 | 60 | - | 180 |
| .... | | | | | | .... |

| FILE NAME | ATTRIBUTE | | | | | ADJUSTED SCORE |
|---|---|---|---|---|---|---|
| | OBJECT DETERMINATION RESULT | DEGREE OF BLURRING /CAMERA-SHAKE | DEGREE OF BRIGHTNESS | COLOR | PERSON | |
| 0010.xxx | PERSON | 60 | 60 | 85 | PERSON A (+100) | 305 |
| 0011.xxx | FOOD (-300) | 85 | 80 | 90 | - | -45 |
| 0012.xxx | PET | 50 | 50 | 70 | - | 170 |
| 0013.xxx | LANDSCAPE | 90 | 90 | 90 | PERSON A, PERSON B (+200) | 470 |
| 0014.xxx | LANDSCAPE | 50 | 70 | 60 | - | 180 |
| ⋯ | ⋯ | ⋯ | ⋯ | ⋯ | ⋯ | ⋯ |

| FILE NAME | OBJECT DETERMINATION RESULT | ATTRIBUTE | | | | ADJUSTED SCORE |
| --- | --- | --- | --- | --- | --- | --- |
| | | DEGREE OF BLURRING /CAMERA-SHAKE | DEGREE OF BRIGHTNESS | COLOR | PERSON | |
| 0010.xxx | PERSON | 60 | 60 | 85 | PERSON A (+100 −300) | 5 |
| 0011.xxx | FOOD | 85 | 80 | 90 | - | 255 |
| 0012.xxx | PET | 50 | 50 | 70 | - | 170 |
| 0013.xxx | LANDSCAPE | 90 | 90 | 90 | PERSON A, PERSON B (−300 +200) | 170 |
| 0014.xxx | LANDSCAPE | 50 | 70 | 60 | - | 180 |
| ... | ... | ... | ... | ... | ... | ... |

| FILE NAME | ATTRIBUTE | | | | ADJUSTED SCORE |
|---|---|---|---|---|---|
| | DISPLAY PERIOD | DISPLAY POSITIONAL RELATIONSHIP | SIMILARITY | ESTIMATION RESULT | |
| 0010.xxx | 1 SECOND | DISTANT (100 PIXELS) | LOW (20%) | NO INTENTION (NOT SEEN) | 0 |
| 0011.xxx | 5 SECONDS | CLOSE (10 PIXELS) | LOW (10%) | USER DOES NOT WANT TO SELECT | -300 |
| 0012.xxx | 5 SECONDS | CLOSE (10 PIXELS) | LOW (10%) | USER DOES NOT WANT TO SELECT | -300 |
| 0013.xxx | 5 SECONDS | CLOSE (10 PIXELS) | LOW (40%) | USER DOES NOT WANT TO SELECT | -300 |
| 0014.xxx | 5 SECONDS | CLOSE (10 PIXELS) | HIGH (80%) | SUSPENDED DUE TO SIMILARITY | -50 |
| ..... | | | | ..... | ..... |

| FILE NAME | OBJECT DETERMINATION RESULT | ATTRIBUTE | | | | STANDARD SCORE |
|---|---|---|---|---|---|---|
| | | DEGREE OF BLURRING /CAMERA-SHAKE | DEGREE OF BRIGHTNESS | COLOR | PERSON | |
| 0010.xxx | PERSON | 60 | 60 | 85 | PERSON A (+100) | 305 |
| 0011.xxx | FOOD | 50 | 70 | 60 | - | 180 |
| 0012.xxx | PET | 50 | 50 | 70 | - | 170 |
| 0013.xxx | LANDSCAPE | 90 | 90 | 90 | PERSON A, PERSON B (+200) | 470 |
| 0014.xxx | LANDSCAPE | 85 | 80 | 90 | - | 255 |
| .... | .... | .... | .... | .... | .... | .... |

| FILE NAME | ATTRIBUTE | | | | | ADJUSTMENT VALUE | ADJUSTED SCORE |
|---|---|---|---|---|---|---|---|
| | OBJECT DETERMINATION RESULT | DEGREE OF BLURRING /CAMERA-SHAKE | DEGREE OF BRIGHTNESS | COLOR | PERSON | | |
| 0010.xxx | PERSON | 60 | 60 | 85 | PERSON A (+100) | 0 | 305 |
| 0011.xxx | FOOD (+300) | 50 | 70 | 60 | - | -300 | 180 |
| 0012.xxx | PET | 50 | 50 | 70 | - | -300 | -130 |
| 0013.xxx | LANDSCAPE | 90 | 90 | 90 | PERSON A, PERSON B (+200) | -300 | 170 |
| 0014.xxx | LANDSCAPE | 85 | 80 | 90 | - | -50 | 205 |
| ... | ... | ... | ... | ... | ... | ... | ... |

302B

IMAGE PROCESSING APPARATUS, IMAGE PROCESSING METHOD, AND PROGRAM

CROSS-REFERENCE TO RELATED APPLICATIONS

The present application claims priority under 35 U.S.C. § 119 to Japanese Patent Application No. 2020-033963 filed on Feb. 28, 2020. The above application is hereby expressly incorporated by reference, in its entirety, into the present application.

BACKGROUND OF THE INVENTION

1. Field of the Invention

The present disclosure relates to an image processing apparatus, an image processing method, and a program.

2. Description of the Related Art

A service is known in which an original photo album is created using images owned by a user. For example, a service has been proposed in which a plurality of images owned by a user are transmitted to a service provider through the Internet and a photo album having a layout desired by the user is created using the transmitted plurality of images.

JP2011-049870A discloses an album creating system that creates a photo album using images designated by a user. JP2014-063246A discloses an electronic album creating apparatus that acquires attribute information of images designated by a user, extracts images according to attributes, and creates a photo album.

JP2014-174787A discloses a photo album apparatus that sets important images from images displayed on a display screen in accordance with user's designation and creates an electronic album according to a user's intention so that a ratio of the important image included in the album is higher than a ratio of images other than the important images included in the album.

In creating a photo album, it is necessary to perform a time-consuming process of selecting images to be included in the photo album from a large number of images and laying out the selected images neatly. For those who are new to the creation of the photo album, such troublesome work becomes a burden. In consideration of this situation, software for automatically selecting images and laying out images is provided as photo album ordering software, a photo album creating support apparatus, or the like.

JP2016-081319A discloses an image material support apparatus that is used for creating an album. The apparatus disclosed in this patent document acquires, in the vicinity of a first image material selected by a user, a second image material having an image feature that satisfies a prescribed selection condition for a feature of the first material, and creates a layout page in which the second image material is placed in the vicinity of the first image material.

JP2014-191701A discloses an image search apparatus that calculates a value of a feature amount representing a feature of an image, scores the image on the basis of the value of the feature amount, and displays a prescribed number of images with high scores as search results. In the apparatus disclosed in this patent document, an image selected by a user is considered to be preferred by the user, and is assigned a high weighting coefficient of the feature amount so as to obtain a high score. Thus, the user's preferred images are laid out.

SUMMARY OF THE INVENTION

However, automatic image selection and automatic image layout do not show an accuracy of 100% with respect to a user's request, which results in a user's new labor for image reselection, layout correction, or the like.

In automatically creating a photo album, images to be used for the photo album are automatically selected from images owned by a user. Meanwhile, in the automatic image selection, there may occur a case where an image that the user wants to select is not selected and a case where an image that the user does not want to select is selected. In such a case, the user needs to reselect an image from the images owned by the user.

Further, in creating a photo album with only images that the user really wants to select, it is necessary to manually select only the images that the user really wants from a large number of images owned by the user. Such selection work may be a heavy burden on a certain user.

The present disclosure has been made in view of such circumstances, and an object of the present disclosure is to provide an image processing apparatus, an image processing method, and a program capable of reducing a user's labor in automatically creating a photo album.

In order to achieve the above object, the following disclosure modes are provided.

According to an aspect of the present disclosure, there is provided an image processing apparatus comprising one or more processors, wherein the processor acquires a plurality of candidate images, acquires user selection information regarding a user-selected image selected by a user from the obtained plurality of candidate images, assigns an attribute to the user-selected image on the basis of an analysis result of the user-selected image, estimates a user selection standard that is a standard in selecting the user-selected image on the basis of a user selection ratio represented by a ratio of the number of the user-selected images having the same attribute to a total number of the user-selected images, and selects an auto-selected image from a non-selected image that is not selected by the user in the candidate images on the basis of the user selection standard.

According to the image processing apparatus according to this aspect of the present disclosure, the user selection standard is estimated on the basis of the attribute of the user-selected image that the user selects from the candidate images, and the non-selected image that is not selected by the user in the candidate images is automatically selected on the basis of the estimated user selection standard. Thus, it is possible to select an image in which a user's preference or the like is reflected, and to reduce a user's labor for selecting the image.

According to still another aspect of the present disclosure, there is provided an image processing method comprising: acquiring a plurality of candidate images; acquiring user selection information regarding a user-selected image selected by a user from the plurality of acquired candidate images; assigning an attribute to the user-selected image on the basis of an analysis result of the user-selected image; estimating a user selection standard that is a standard in selecting the user-selected image on the basis of a user selection ratio represented by a ratio of the number of the user-selected images having the same attribute to a total number of the user-selected images; and selecting an auto-selected image from a non-selected image that is not selected by the user in the candidate images on the basis of the user selection standard.

According to still another aspect of the present disclosure, there is provided a program causing a computer to execute: a process of acquiring a plurality of candidate images; a process of acquiring user selection information regarding a user-selected image selected by a user from the plurality of acquired candidate images; a process of assigning an attribute to the user-selected image on the basis of an analysis result of the user-selected image; a process of estimating a user selection standard that is a standard in selecting the user-selected image on the basis of a user selection ratio represented by a ratio of the number of the user-selected images having the same attribute to a total number of the user-selected images; and a process of selecting an auto-selected image from a non-selected image that is not selected by the user in the candidate images on the basis of the user selection standard.

According to the present disclosure, the user selection standard is estimated on the basis of the attribute of the user-selected image selected by the user from the candidate images, and the non-selected image that is not selected by the user in the candidate images is automatically selected on the basis of the estimated user selection standard. Thus, it is possible to select an image in which a user's preference or the like is reflected, and to reduce a user's labor for selecting the image.

BRIEF DESCRIPTION OF THE DRAWINGS

FIG. 5 is a schematic diagram showing an example of analysis results of selected images.

FIG. 6 is a schematic diagram showing an example of analysis results of non-selected images.

FIG. 7 is a diagram illustrating adjusted scores.

FIG. 8 is a diagram illustrating another example of adjusted scores.

FIG. 10 is a schematic diagram showing an example of analysis results of selected images.

FIG. 11 is a schematic diagram showing an example of analysis results of non-selected images.

FIG. 12 is a diagram illustrating adjusted scores.

FIG. 13 is a diagram illustrating another example of adjusted scores.

FIG. 15 is a diagram illustrating a user's preference or the like estimated from display non-selected images.

FIG. 16 is a diagram showing an example of standard scores.

FIG. 17 is a diagram illustrating adjusted scores.

DESCRIPTION OF THE PREFERRED EMBODIMENTS

Hereinafter, preferred embodiments of the present disclosure will be described in detail with reference to the accompanying drawings. In this specification, the same components will be denoted by the same standard numerals, and redundant description will be appropriately omitted.

First Embodiment

Configuration Example of Image Processing Apparatus

Figure 1:
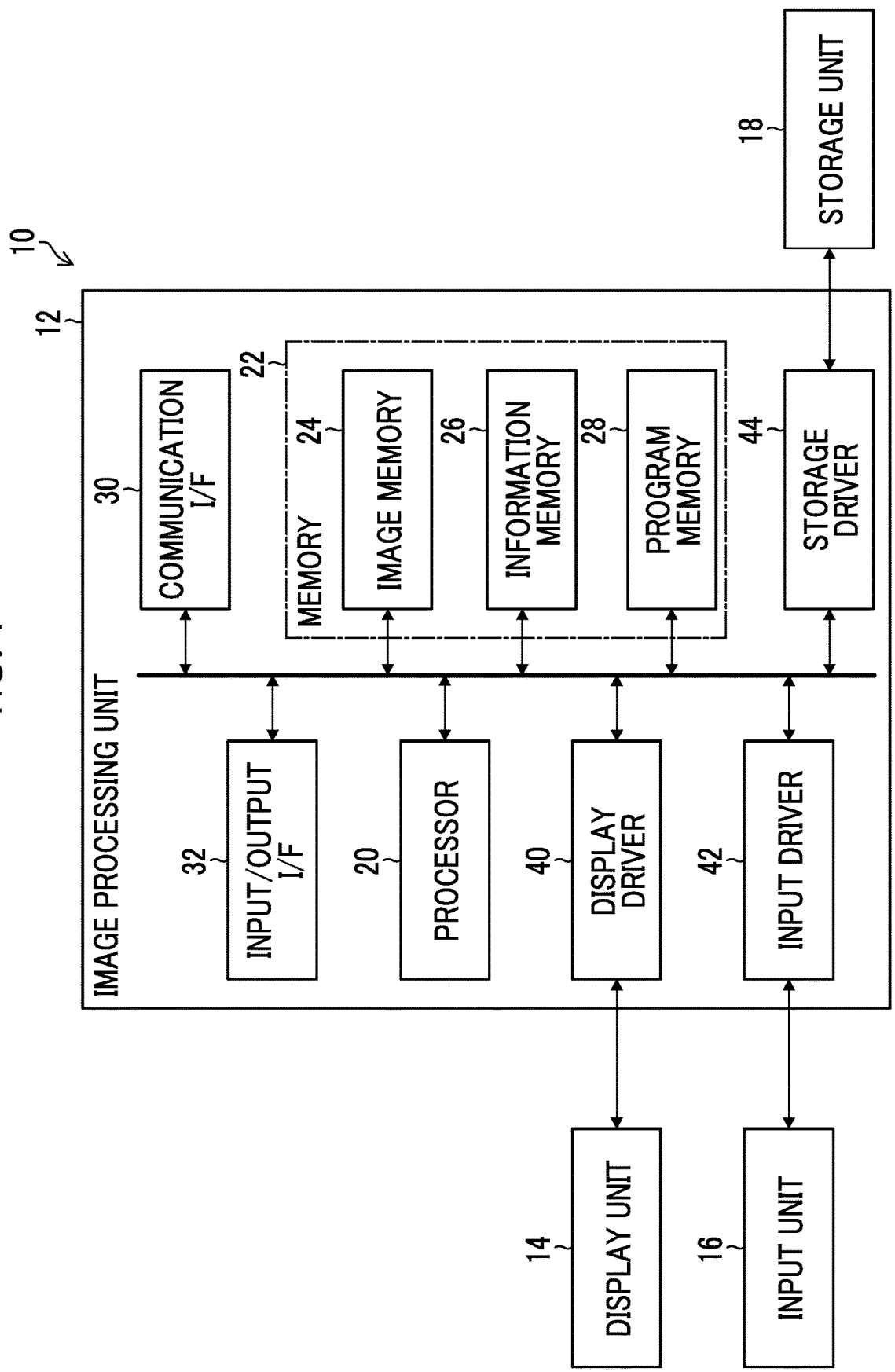
FIG. 1 is a functional block diagram of an image processing apparatus according to a first embodiment.

FIG. 1 is a functional block diagram of an image processing apparatus according to a first embodiment. An image processing apparatus 10 shown in the figure executes photo album auto-creation software to automatically select images to be used for a photo album, performs an automatic layout of the selected images, and performs an order to a photo album creator.

The term "creation" in this specification may be alternatively read as generation and manufacturing. Further, the term "apparatus" may be alternatively read as a system.

The image processing apparatus 10 may be a mobile terminal device such as a computer or a smartphone. Note that the term "image" in this specification may be used to mean image data that is an electrical signal representing an image. Further, the image may be alternatively read as a photograph.

The image processing apparatus 10 comprises an image processing unit 12, a display unit 14, an input unit 16, and a storage unit 18. The image processing unit 12 comprises a processor 20 and a memory 22. The memory 22 comprises an image memory 24, an information memory 26, and a program memory 28.

The processor 20 reads out and executes photo album auto-creation software stored in the program memory 28, and executes a prescribed process for images read out from the image memory 24. The processor 20 stores acquired various information in the information memory 26.

The image processing unit 12 comprises a communication interface 30 and an input/output interface 32.

The communication interface 30 includes a communication port for connection to a network. For example, the image processing unit 12 may perform data communication with an external device through the network using the communication interface 30. The communication interface 30 may be applied to either wireless communication or wired communication.

As the input/output interface 32, a port to which an electrical signal line such as a USB cable is connected, a slot into which a device such as a memory card is inserted, or the like, is applied. Here, USB is an abbreviation for Universal Serial Bus.

The image processing unit 12 comprises a display driver 40, an input driver 42, and a storage driver 44.

The display driver 40 performs a display control of the display unit 14. The display driver 40 transmits a video signal representing a video to be displayed on the display unit 14 to the display unit 14. The display unit 14 displays the video according to the video signal transmitted from the display driver 40.

The input driver 42 acquires a signal representing information input through the input unit 16. The input driver 42 transmits the signal transmitted through the input unit 16 to the processor 20. The processor 20 controls the image processing unit 12 on the basis of the signal transmitted through the input unit 16.

The input unit 16 may be a keyboard, a mouse, or the like. A touch panel may be applied as the input unit 16. In a configuration in which a touch panel method is applied, the input unit 16 and the display unit 14 are configured as an integral unit.

The storage driver 44 controls writing of data into the storage unit 18 and reading of data from the storage unit 18. That is, the processor 20 may acquire a user-owned image stored in the storage unit 18 through the storage driver 44.

In a case where a mobile terminal device is applied as the image processing apparatus 10, a configuration in which the image processing unit 12, the display unit 14, the input unit 16, and the storage unit 18 are housed in the same case may be applied.

Figure 2:
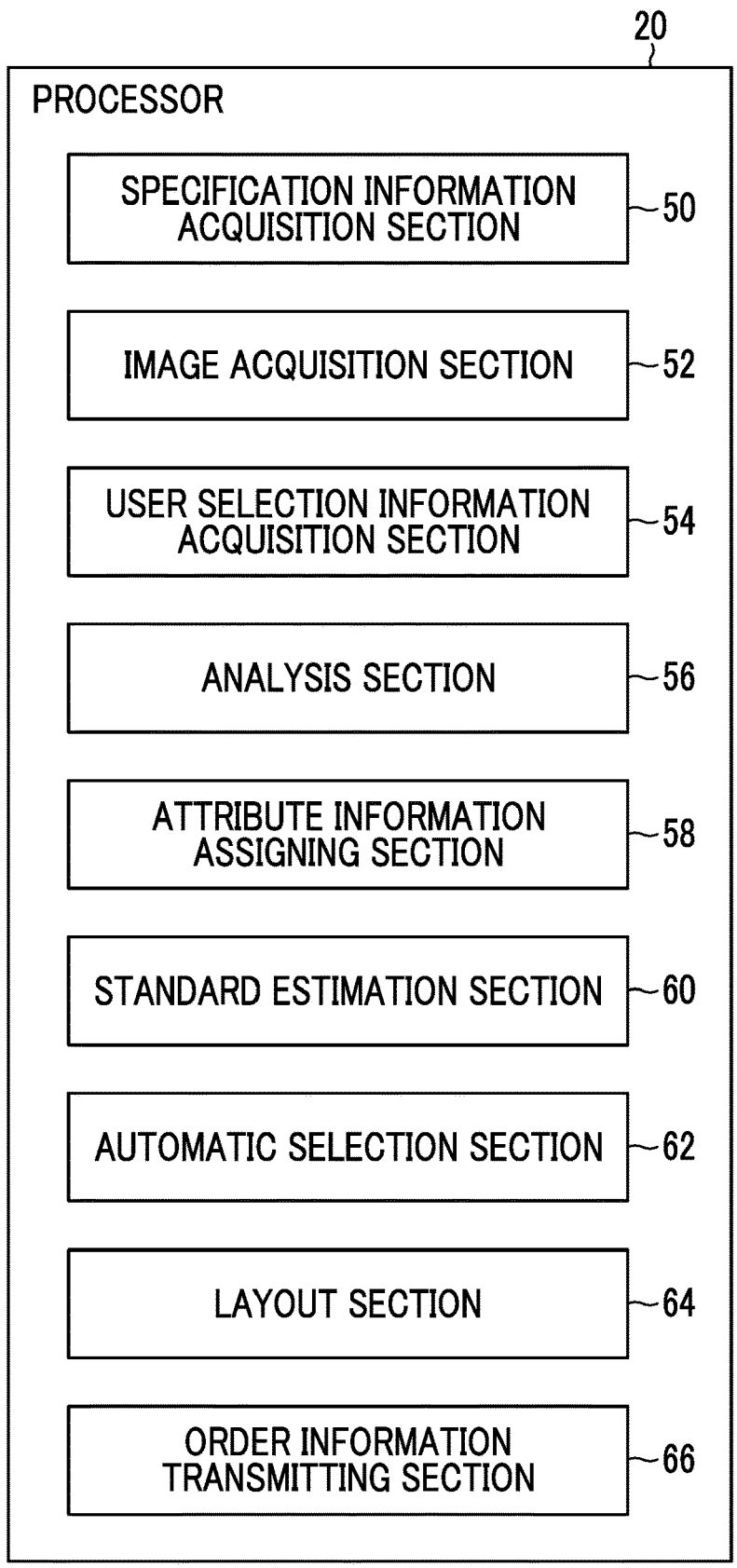
FIG. 2 is a functional block diagram of a processor shown in FIG. 1.

FIG. 2 is a functional block diagram of the processor shown in FIG. 1. Respective processing sections of the processor 20 shown in the figure are associated with various functions of the processor 20.

The processor 20 comprises a specification information acquisition section 50. The specification information acquisition section 50 acquires specification information regarding photo album specifications such as the size and the number of pages of the photo album. The specification information may include, for example, information regarding the number of images to be used for the photo album.

The information regarding the number of images to be used for the photo album indicates, for example, a minimum number of images necessary for creating the photo album or a maximum number of images used for creating the photo album. Further, the information regarding the number of images to be used for the photo album may be set as the number of images or the number of pages.

That is, the information regarding the number of images to be used for the photo album may be prescribed by the number of pages and the number of images to be used for each page. Further, the specification information may include, for example, information regarding the sizes of images to be used for the photo album. The specification information may be input by a user using the input unit 16.

Figure 4:
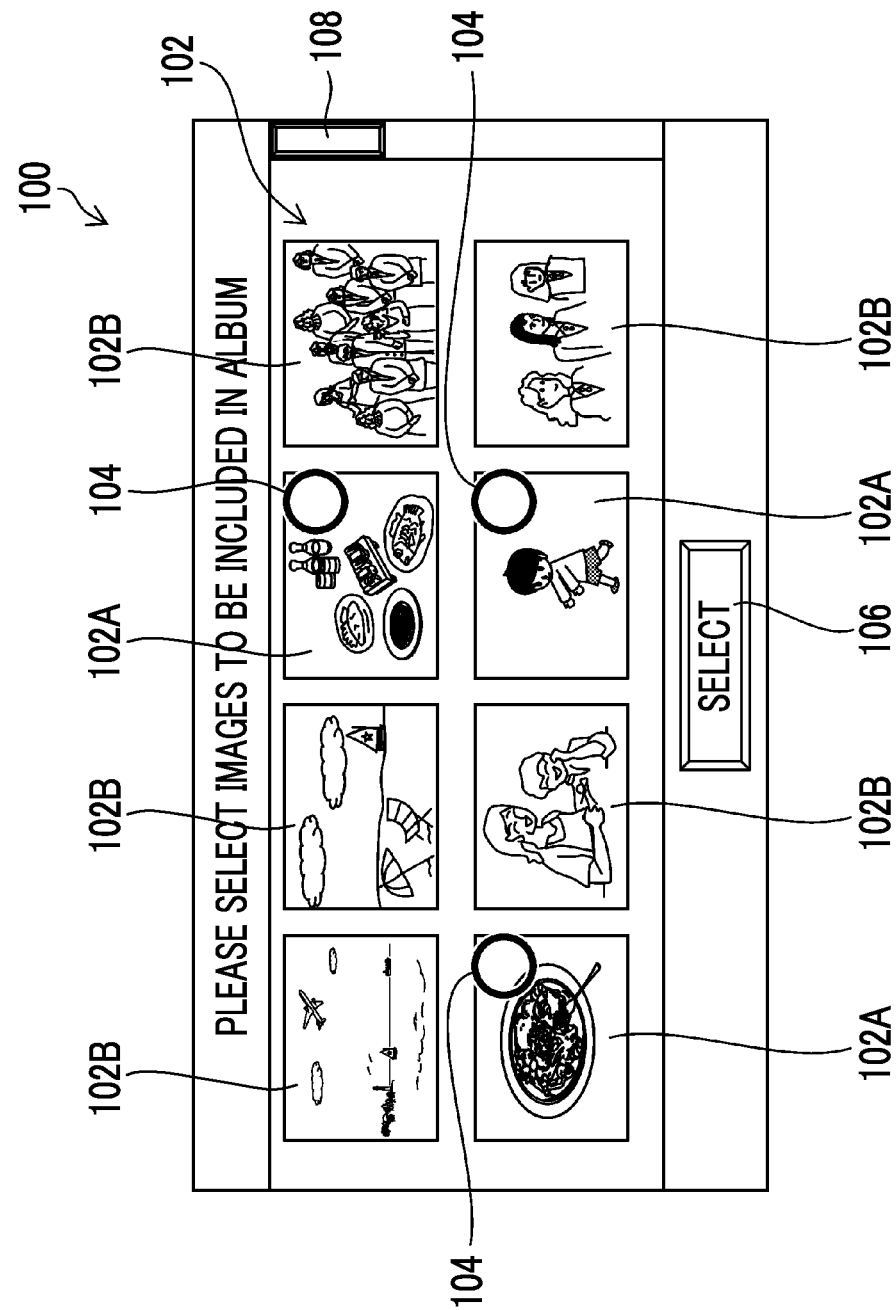
FIG. 4 is a schematic diagram showing an example of a selection screen.

The processor 20 comprises an image acquisition section 52. The image acquisition section 52 acquires candidate images that are a plurality of images owned by the user and are candidates for images to be used for the photo album. The image acquisition section 52 may acquire the candidate images in the unit of folders. The image acquisition section 52 may acquire the candidate images from an external device or the like connected to the network through the communication interface 30, or may acquire the candidate images from the external device or the like connected through the input/output interface 32. Note that the candidate images are shown in FIG. 4 using a standard numeral 102.

The processor 20 comprises a user selection information acquisition section 54. The user selection information acquisition section 54 acquires user selection information for a user-selected image that is manually selected by the user from the candidate images. The user selection information acquisition section 54 stores the user selection information in the information memory 26 shown in FIG. 1. As the user selection information, identification information of the user-selected image such as a file name of the user-selected image may be applied.

For the user-selected image, an upper limit value of the number of selectable candidate images may be set. The upper limit value of the number of selectable candidate images may be set according to the information regarding the number of images to be used for the photo album. The upper limit value of the number of selectable candidate images may be arbitrarily set within a range of 0% to 100% of a total number of candidate images. The upper limit value of the number of selectable candidate images may be a fixed value that is determined in advance, or a variable value that is appropriately set by the user.

Further, for the user-selected image, a lower limit value of the number of candidate images that need to be selected may be set. For example, the lower limit value may be set to 2, and the user may need to select two or more candidate images.

The processor 20 comprises an analysis section 56. The analysis section 56 analyzes the user-selected image on the basis of prescribed attributes such as the type of an object, the degree of focus indicating the degree of blurring and the degree of camera-shake of an image, the degree of brightness, a color, and the presence or absence of a person. The analysis section 56 stores an analysis result of the user-selected image in the information memory 26. Note that the user-selected image is shown in FIG. 4 using a standard numeral 102A.

The processor 20 comprises an attribute information assigning section 58. The attribute information assigning section 58 assigns attribute information for each type of attributes to be applied to the analysis of the user-selected image to the user-selected image. The attribute information assigning section 58 stores the attribute information for each user-selected image, and each attribute type in the information memory 26. The attribute type and the attribute information are shown in FIG. 5, or the like.

The processor 20 comprises a standard estimation section 60. The standard estimation section 60 estimates a user selection standard corresponding to a user's preference, intention and the like on the basis of the attribute information. That is, the standard estimation section 60 may estimate the user selection standard for selecting an image that the user wants to select, which corresponds to the user's preference, from determination results of objects. Further, the standard estimation section 60 may estimate the user selection standard for selecting an image in which a specific person is included in the user-selected image as attribute information.

The standard estimation section 60 divides the number of user-selected images to which the same attribute information is assigned by a total number of user-selected images to calculate a user selection ratio, and estimates the user selection standard on the basis of the user selection ratio. The standard estimation section 60 stores the estimated user selection standard in the information memory 26.

The standard estimation section 60 may estimate the user selection standard on the basis of a comparison result of the user selection ratio and a prescribed threshold value. The prescribed threshold value may be a fixed value that is prescribed in advance, or a variable value that may be arbitrarily set by the user or the like.

Further, the prescribed threshold value may have a different threshold value for each attribute. For example, a lower threshold value may be set for items such as the type of an object and the presence or absence of a person for which relative comparison is easy, compared with items such as the degree of focus, the degree of brightness, and a color for which relative comparison is difficult.

The standard estimation section 60 may calculate an evaluation value for each user-selected image and each piece of attribute information, calculate a standard score for each user-selected image on the basis of the evaluation value, calculate a correction value on the basis of the user selection ratio, and adjust the standard score using the correction value to calculate an adjusted score. The adjusted score functions as a numerical index corresponding to the user's preference or the like for each user-selected image.

The processor 20 comprises an automatic selection section 62. The automatic selection section 62 selects auto-selected images from non-selected images of candidate images as images to be used for the photo album by applying the user selection standard estimated using the standard estimation section 60.

The automatic selection section 62 may select a prescribed number of auto-selected images from the non-selected images in a descending order of the adjusted scores calculated using the standard estimation section 60. The number of auto-selected images to be selected may be set to at least one of an upper limit value or a lower limit value. For example, at least one of the upper limit value or the lower limit value may be set on the basis of information regarding the number of images included in the specification information of the photo album.

The non-selected images are shown in FIG. 4 using standard numerals 102B. The automatic selection section 62 stores auto-selected image information including identification information such as file names of the auto-selected images in the information memory 26.

The processor 20 may comprise a layout section 64. The layout section 64 creates an automatic layout of the photo album using the user-selected images and the auto-selected images on the basis of the specifications of the photo album acquired by the specification information acquisition section 50. The layout section 64 causes the display unit 14 to display the photo album for which the automatic layout is completed.

The layout section 64 may accept editing of the automatic layout, and may perform manual editing of editing the automatic layout. As an example of the manual editing, a form in which the user manually inputs editing content using the input unit 16 or the like, with respect to the automatic layout displayed on the display unit 14, may be used.

The processor 20 may comprise an order information transmitting section 66. The order information transmitting section 66 transmits order information of the photo album to a creator of the photo album through the communication interface 30. The order information includes specifications of the photo album, images to be used for the photo album, a layout of the photo album approved by the user, and the like. The order information may include information such as a delivery deadline and a delivery method.

Note that the layout section 64 and the order information transmitting section 66 are not included in the image processing apparatus 10, and instead, a function of the layout section 64 and a function of the order information transmitting section 66 may be performed in an external device or the like connected to the image processing apparatus 10.

Procedure of Image Processing Method

Figure 3:
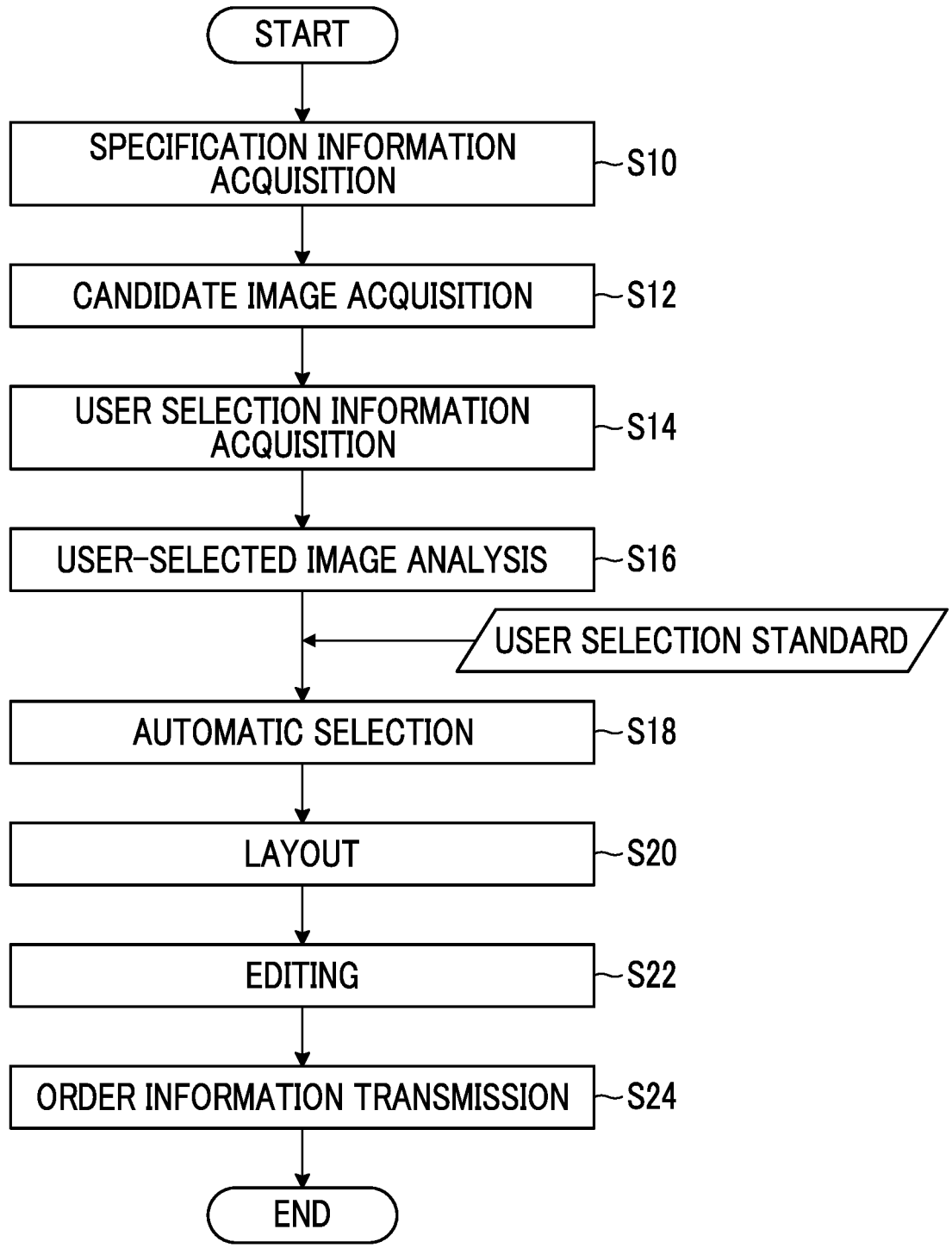
FIG. 3 is a flowchart showing a procedure of an image processing method according to the first embodiment.

FIG. 3 is a flowchart showing a procedure of an image processing method according to the first embodiment. In a specification information acquisition step S10, the specification information acquisition section 50 shown in FIG. 2 acquires specification information of a photo album. The specification information acquisition section 50 stores the specification information in the information memory 26 shown in FIG. 1. After the specification information acquisition step S10, the procedure proceeds to a candidate image acquisition step S12.

In a case where photo album creating software is not installed in the image processing apparatus 10 shown in FIG. 1, a preparation step for downloading the photo album creating software from a download site and installing the result, before the specification information acquisition step S10, is performed.

The specification information of the photo album is, for example, information including the size of the photo album and the number of pages thereof. Examples of the size of the photo album include A4, A5, A5 square, and the like. Examples of the number of pages include 16 pages, 24 pages, 32 pages, 40 pages, 48 pages, and the like. The number of images necessary for creating the photo album is determined on the basis of designation of the size and the number of pages. For example, in a case where 24 pages are designated, a necessary minimum number of images is 100.

In the candidate image acquisition step S12, the image acquisition section 52 acquires candidate images owned by a user.

The image acquisition section 52 stores the acquired candidate images in the image memory 24. After the candidate image acquisition step S12, the procedure proceeds to a user selection information acquisition step S14.

The candidate images may be classified and stored in a plurality of folders on the basis of attributes and the like. In the candidate image acquisition step S12, the image acquisition section 52 may select one or more folders from the plurality of folders and acquire the candidate images included in the selected folders, or may collectively acquire a plurality of images stored in a memory card as the candidate images. Further, in the candidate image acquisition step S12, the image acquisition section 52 may search for images associated with the user, and may automatically acquire the searched images as the candidate images.

In the user selection information acquisition step S14, the user selection information acquisition section 54 acquires user selection information for user-selected images. After the user selection information acquisition step S14, the procedure proceeds to the user-selected image analysis step S16.

In the user-selected image analysis step S16, the analysis section 56 analyzes the user-selected images. The standard estimation section 60 estimates the user selection standard according to the user's preference on the basis of the analysis result. The standard estimation section 60 stores the estimated user selection standard in the information memory 26. After the user-selected image analysis step S16, the procedure proceeds to an automatic selection step S18.

In the automatic selection step S18, the automatic selection section 62 selects auto-selected images from the non-selected images of the candidate images using the user selection standard estimated in the user-selected image analysis step S16. The automatic selection section 62 stores auto-selected image information on the auto-selected images in the information memory 26. After the automatic selection step S18, the procedure proceeds to a layout step S20.

In the layout step S20, the layout section 64 creates an automatic layout of the photo album on the basis of the specification information such as the size and the number of pages acquired in the specification information acquisition step S10 using the user-selected images and the auto-selected images.

In the layout step S20, the layout section 64 may display the automatic layout using the display unit 14. The layout section 64 stores layout information regarding the automatic layout in the information memory 26. After the layout step S20, the procedure proceeds to an editing step S22.

In the editing step S22, the layout section 64 accepts user's manual editing on the automatic layout, and edits the automatic layout. The layout section 64 may display the edited layout using the display unit 14. The layout section 64 stores layout editing information on the edited layout in the information memory 26. Note that the editing step S22 may be omitted. After the editing step S22, the procedure proceeds to an order information transmitting step S24.

In the order information transmitting step S24, the order information transmitting section 66 transmits photo album order information including the specification information of the photo album, the images to be used for the photo album, the layout information of the photo album, and the like to a creator of the photo album.

After the order information transmitting step S24, a prescribed ending process is performed, and the processor 20 ends the image processing method. The photo album creator who receives the order information creates the photo album on the basis of the order information.

Note that the layout step S20, the editing step S22, and the order information transmitting step S24 may be performed using an external device connected to the image processing apparatus 10, instead of being performed using the image processing apparatus 10 shown in FIG. 1 or the like.

Configuration Example of Selection Screen

FIG. 4 is a schematic diagram showing an example of a selection screen. A selection screen 100 is displayed using the display unit 14. At least a part of candidate images 102 are displayed on the selection screen 100. Thumbnail images may be the candidate images 102 displayed on the selection screen 100 shown in FIG. 4. The selection screen 100 may display supplementary information such as file names of the candidate images 102, a total number of candidate images, the number of user-selected images, and the like.

The user selects two or more user-selected images 102A from the plurality of candidate images 102 displayed on the selection screen 100. In a user-selected image 102A shown in FIG. 4, a select symbol 104 representing the user's selection is displayed in a superimposed manner.

A select button 106 displayed on the selection screen 100 is a button to be operated by the user in confirming the user's selection. By operating a scroll bar 108 on the selection screen 100, the user may sequentially display all the candidate images 102 on the selection screen 100.

Standard numerals 102B shown in FIG. 4 indicate non-selected images among the candidate images 102 that are not selected by the user. In the non-selected images 102B, a select symbol 104 attached to the user-selected images 102A is not displayed in a superimposed manner. Each user-selected images 102A shown in FIG. 4 is an example of a first user-selected image. The user selection information on the user-selected images 102A is an example of first user selection information.

Specific Example of Analysis Process in Selected-Image Analysis Step

In the analysis of the user-selected image 102A shown in FIG. 4, one or more types of attributes such as an object determination result, the degree of blurring, the degree of camera-shake, the degree of brightness, a color, face recognition of a person, and the number of persons are applied, and attribute information is assigned for each attribute.

FIG. 5 is a schematic diagram showing an example of analysis results of selected images. An arbitrary character string is written in a file name shown in FIG. 5. FIG. 5 illustrates the object determination result, the degree of blurring/camera-shake, the degree of brightness, the color, and the person, as the types of attributes. The degree of blurring/camera-shake shown in FIG. 5 indicates the degree of blurring and the degree of camera-shake, in other words, the degree of focus.

As the object determination result, objects may be classified into a person, a landscape, an object type, and the like. FIG. 5 illustrates food, a landscape, and a person as examples of the types of objects. The object determination may be performed using a tagging technique for an image.

As the degree of blurring/camera-shake, a blurring/camera-shake evaluation value represented by a numerical value in a range of 0 to 100 may be applied. In a case where the blurring/camera-shake evaluation value is relatively large, it represents a good image with a relatively small degree of blurring.

The analysis result shown in FIG. 5 indicates that the blurring/camera-shake evaluation values of four user-selected images 102A among five user-selected images 102A are 80 or greater, and therefore, a selection standard with which the user selects images with a blurring/camera-shake evaluation value of 80 or greater may be estimated. In other words, the blurring/camera-shake evaluation value may be estimated as the user selection standard in a case where the user selection ratio satisfies 80% or greater.

As the degree of brightness, a brightness evaluation value represented by a numerical value in a range of 0 to 100 may be applied. In a case where the brightness evaluation value is relatively large, it represents a good image with a relatively high brightness. As the degree of brightness, the lightness in the Munsell color system may be applied.

The analysis result shown in FIG. 5 indicates that brightness evaluation values of three user-selected images 102A among five user-selected images 102A are 80 or greater, and therefore, a user selection standard with which the user selects images with a brightness evaluation value of 80 or greater may be estimated. In other words, the brightness evaluation value may be estimated as the user selection standard in a case where the user selection ratio satisfies 60% or greater.

As the color, a color evaluation value represented by a numerical value in a range of 0 to 100 may be applied. In a case where the color evaluation value is relatively large, it represents a good image with a relatively vivid color. As the brightness, the saturation in the Munsell color system may be applied.

The analysis result shown in FIG. 5 indicates that color evaluation values of three user-selected images 102A among five user-selected images 102A are 80 or greater, and therefore, a user selection standard with which the user selects images with a color evaluation value of 80 or greater may be estimated. In other words, the color evaluation value may be estimated as the user selection standard in a case where the user selection ratio satisfies 60% or greater.

The person indicates whether or not a specific person is included. The user-selected image 102A represented by a file name 0002.xxx shown in FIG. 5 represents that a person A and a person B are included. The user-selected image 102A represented by a file name 0004.xxx represents that the person A is included.

In the analysis result shown in FIG. 5, three user-selected images 102A having a file name 0001.xxx, a file name 0003.xxx, and a file name 0005.xxx among the five user-selected images 102A are assigned food as attribute information. On the basis of this analysis result, a user selection standard with which the user wants to select an image including food may be estimated. In other words, the object determination result may be estimated as the user selection standard in a case where the user selection ratio satisfies 60% or greater.

Further, two user-selected images 102A having the file name 0002.xxx and the file name 0004.xxx, among the five user-selected images 102A, are assigned the person A as attribute information. On the basis of the analysis result, a user selection standard with which the user wants to select an image including the person A may be estimated.

In other words, the person information included in the person determination result may be estimated as the user selection standard in a case where the user selection ratio satisfies 40% or more. As for the person determination result, the user selection standard may be estimated on the basis of a ratio of a user-selected person to a total number of the user-selected images 102A including persons among the user-selected images 102A.

For example, the user-selected images 102A including the person A among the five user-selected images 102A shown in FIG. 5 are the user-selected images 102A having the file name 0002.xxx and the file name 0004.xxx.

Since the person A is assigned to both the user-selected images 102A having the file name 0002.xxx and the file name 0004.xxx, the ratio of the user-selected person for the person A is 100%. For example, in a case where a threshold value for estimating the user selection standard is 80% or greater, a user selection standard with which the user wants to select an image including the person A may be estimated.

That is, in the analysis process of the user-selected image 102A, attribute information is assigned to one or more types of attributes for each user-selected image 102A, the user selection standard according to the user's preference or the like is estimated on the basis of the user selection ratio obtained by dividing the number of user-selected images 102A having the same attribute information by the total number of the user-selected images 102A.

In the example shown in FIG. 5, an example in which the user selection standard is estimated using the attribute information in which the user selection ratio is equal to or greater than a predetermined threshold value is illustrated, but the threshold value for the user selection ratio may be arbitrarily prescribed according to the number of user-selected images or the like. The threshold value for the user selection ratio may be a preset fixed value or a setting value manually set by the user.

Note that the types of attributes shown in FIG. 5 are examples, and the types of attributes applied to the selected images are not limited to the examples of FIG. 5. Further, the number of types of attributes may be one or more. For example, the attributes that are analyzed by the analysis section 56 shown in FIG. 2 and are assigned to the non-selected images may be at least one of the type of an object, the degree of focus representing the degree of blurring of an image and the degree of camera-shake, the degree of brightness, a color, or the presence or absence of the person.

Further, the user selection ratio based on the user-selected images 102A shown in FIG. 5 is an example of a first user selection ratio. The user selection standard based on the first user selection ratio is an example of a first user selection standard.

Specific Example of Selection Process in Automatic Selection Step

In the automatic selection step S18 shown in FIG. 4, the non-selected images 102B in the candidate images are analyzed, and an auto-selected image is selected from the non-selected images 102B using the user selection standard. For the analysis of the non-selected images 102B, the same process as the analysis process of the user-selected images 102A in the selected-image analysis step may be applied.

FIG. 6 is a schematic diagram showing an example of analysis results of non-selected images. In the analysis results of the non-selected images 102B shown in FIG. 6, attribute information is assigned to the non-selected images 102B with respect to the same types of attributes as the analysis results of the user-selected images 102A shown in FIG. 5.

For the non-selected images 102B, a standard score is calculated for each non-selected image 102B using the attribute information assigned to each non-selected images 102B. The standard score shown in FIG. 6 is calculated by adding up numerical values obtained by scoring the number of persons, with a score per person being 100, with respect to a sum of a blurring/camera-shake evaluation value, a brightness evaluation value, and a color evaluation value.

Then, an adjusted score is calculated by adjusting the standard score on the basis of the user selection standard. In a case where the user selection standard with which the user wants to select an image including food in an object is estimated, a non-selected image 102B including food in the object is assigned an adjustment value by a positive weight to calculate the adjusted score. A prescribed number of auto-selected images are selected in a descending order of the adjusted scores.

FIG. 7 is a diagram illustrating adjusted scores. Since an analysis result that the object includes food is obtained for the non-selected image 102B having a file name 0011.xxx, the adjusted score is calculated by applying a positive adjustment value +300 to the standard score shown in FIG. 6.

Further, in a case where the selection standard with which the user wants to select an image including a person is estimated, the non-selected image 102B including the person in the object is assigned a positive adjustment value by a positive weight, so that the adjusted score obtained by adjusting the standard score shown in FIG. 6 is calculated.

FIG. 8 is a diagram illustrating another example of adjusted scores. Since in either the non-selected images 102B having the file name 0010.xxx or the non-selected image 102B having the file name 0013.xxx, an analysis result in which the person A is included in the object is obtained, a positive adjustment value +300 is applied with respect to the standard score shown in FIG. 6 to calculate an adjusted score.

In this way, the adjusted score obtained by adjusting the standard score calculated on the basis of the analysis result of the non-selected image 102B is calculated using the adjustment value as the weight corresponding to the user selection standard, and the auto-selected images are selected in a descending order of the adjusted scores.

In the present embodiment, the adjustment value adjusted by a user determination standard based on a plurality of attributes such as an object determination result and a person is set to the same value, but the present disclosure is not limited thereto. Different adjustment values may be set for respective attributes.

For example, the adjustment value adjusted using the user determination standard based on attributes such as the degree of blurring/camera-shake, the degree of brightness, and the color may be a smaller value, compared with the adjustment value are adjusted using the user determination standard based on the object determination result, the person, and the like.

Specific Example of Automatic Layout

In a case where a plurality of images selected from the candidate images 102 as images to be used for the photo album are laid out on each page of the photo album, the user-selected images 102A may be preferentially laid out with respect to the auto-selected images.

For example, in laying out the user-selected images 102A and the auto-selected images on each page of the photo album, the user-selected images 102A may have a layout larger than that the auto-selected images, or the user-selected images 102A may be laid out on a page having a smaller page number those that of the auto-selected images.

Operational Effects of the First Embodiment

According to the image processing apparatus and the image processing method according to the first embodiment, it is possible to obtain the following operational effects.

[1]

The user-selected images 102A selected by the user are analyzed, and the user selection standard is estimated. The automatic selection of the non-selected images 102B is performed on the basis of the estimated user selection standard. Thus, it is possible to perform an automatic layout of a photo album using the user-selected images and the auto-selected images.

[2]

A standard score based on attribute information is calculated for each non-selected image 102B. The standard score is adjusted using an adjustment value representing a weight based on the user selection standard to calculate an adjusted score for each non-selected image 102B. Thus, it is possible to select the auto-selected images to be used for the photo album in a descending order of the adjusted scores.

Second Embodiment

Overall configuration of image processing apparatus

Next, an image processing apparatus according to a second embodiment will be described. In the following description, differences from the image processing apparatus 10 according to the first embodiment will be mainly described. An overall configuration of the image processing apparatus according to the second embodiment will be described with reference to FIG. 2.

In the image processing apparatus according to the second embodiment, a user manually selects a user-selected image that the user does not want to include in a photo album, a user selection standard in which a user's preference or the like that the user does not want to include in the photo album is reflected is estimated on the basis of the analysis result of the user-selected image, and an image that the user does not want to include in the photo album from the non-selected images is excluded from the auto-selected images.

In other words, in selecting the auto-selected images from the non-selected images, a non-selected image estimated as the image that the user does not want to include in the photo album is excluded, so that the auto-selected images to be used for the photo album are selected.

The user selection information acquisition section 54 acquires user selection information of the user-selected image manually selected by the user from the viewpoint of the image that the user does not want to include in the photo album. The analysis section 56 analyzes the user-selected image, and the attribute information assigning section 58 assigns attribute information for each type of attribute for each user image.

The standard estimation section 60 estimates a user selection standard of the image that the user does not want to include in the photo album, on the basis of a ratio of the user-selected images having the same attribute information to a total number of user-selected images. In other words, the standard estimation section 60 estimates the user selection standard as a negative weight.

The automatic selection section 62 selectively excludes, from the non-selected images, an image estimated as the image that the user does not want to include in the photo album on the basis of the user selection standard, and selects the non-selected images in which the exclusion target image is excluded as auto-selected images.

Figure 9:
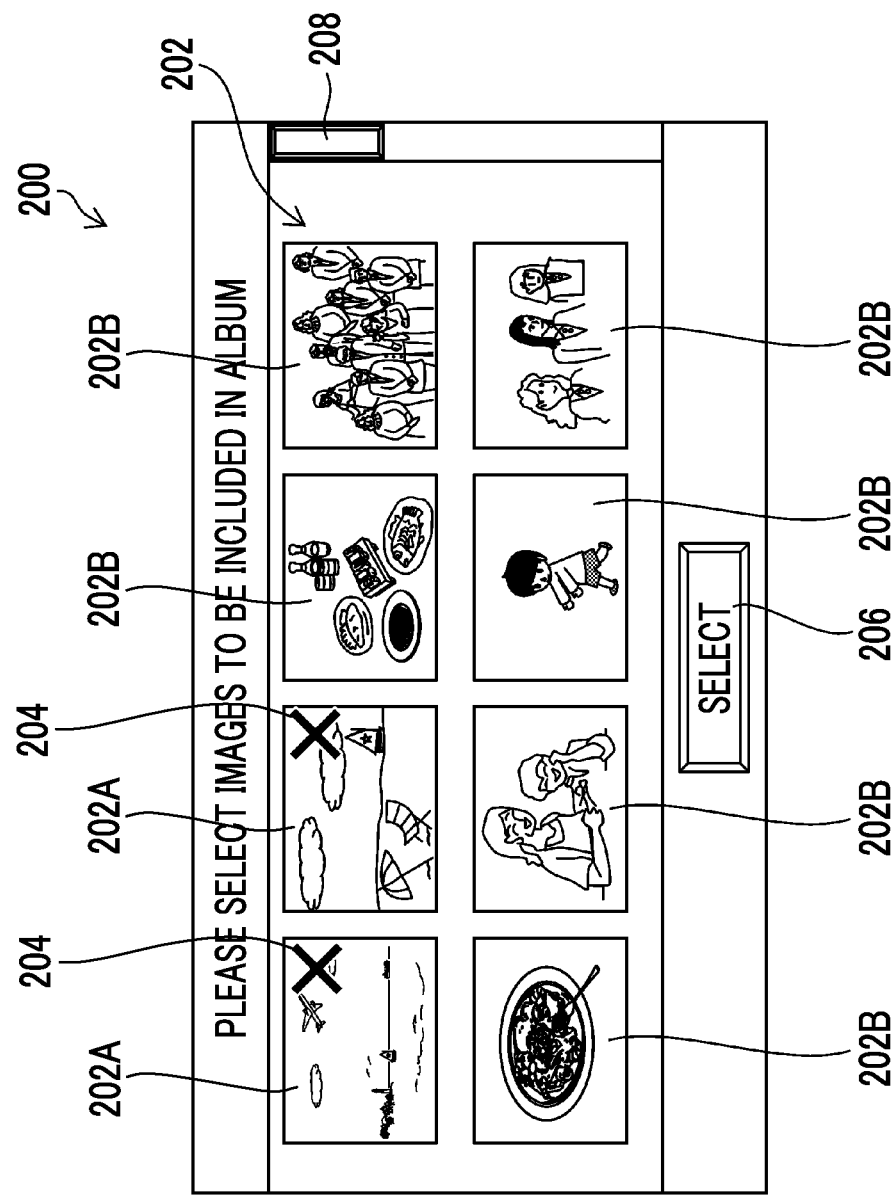
FIG. 9 is a schematic diagram of a selection screen applied to an image processing apparatus according to a second embodiment.

The layout section 64 performs an automatic layout of the photo album using the user-selected images and the auto-selected images. Note that the candidate images are shown in FIG. 9 using a standard numeral 202. The user-selected images are shown in FIG. 9 using a standard numeral 202A. The non-selected images are shown in FIG. 9 using a standard numeral 202B.

Procedure of Image Processing Method

An image processing method according to the second embodiment will be described with reference to FIG. 3. In the user selection information acquisition step S14, the user selection information acquisition section 54 acquires user selection information for the user-selected images manually selected by the user from the viewpoint of the image that the user does not want to include in the photo album.

In the user-selected image analysis step S16, the user-selected images are analyzed, and the user selection standard of the image that the user does not want to include in the photo album is estimated on the basis of the ratio of the user-selected images having the same attribute information to the total number of the user-selected images.

In the automatic selection step S18, an image estimated as the image that the user does not want to include in the photo album is selectively excluded from the non-selected images on the basis of the user selection standard, and the non-selected images in which the exclusion target image is excluded are selected as the auto-selected images.

In the layout step S20, an automatic layout of the photo album is performed using the user-selected images and the auto-selected images.

Configuration Example of Selection Screen

FIG. 9 is a schematic diagram of a selection screen applied to the image processing apparatus according to the second embodiment. On a selection screen 200, negative select symbols 204 indicating the user's selection are superimposed with the user-selected images 202A.

In a case where the user operates a select button 206, the user's selection is confirmed for the image that the user does not want to include in the photo album. On the selection screen 200, the user may operate a scroll bar 208 to sequentially display all the candidate images 202 on the selection screen 200.

The user-selected images 202A shown in FIG. 9 are examples of second user-selected images selected by the user from the candidate images as images that are not to be used for the photo album. The user selection information corresponding to the user-selected images 202A shown in FIG. 9 is an example of second user selection information. A user selection ratio based on the user-selected images 202A shown in FIG. 9 is an example of a second user selection ratio. The user selection standard estimated on the basis of the user-selected images 202A shown in FIG. 9 is an example of a second user selection standard.

Specific Example of Analysis Process in Selected-Image Analysis Step

FIG. 10 is a schematic diagram showing an example of analysis results of selected images. In the analysis result of the selected images in the second embodiment, similar to the first embodiment, object determination, the degree of blurring/camera-shake, the degree of brightness, a color, face recognition of a person, and the number of persons are applied as attributes.

In the analysis result shown in FIG. 10, three user-selected images 202A in which an object includes a landscape, among five user-selected images 202A, are selected. This makes it possible to estimate a user selection standard with which the user does not want to include the image in which the object includes the landscape in the photo album. In other words, the object determination result may be estimated as the user selection standard in a case where the user selection ratio satisfies 60% or greater.

Further, two user-selected images 202A in which the object includes the person C are selected, among the five user-selected images 202A. This makes it possible to estimate a user selection standard with which the user does not want to include an image in which the object includes the person C in the photo album.

In other words, the person determination result may be estimated as the user selection standard in a case where the user selection ratio satisfies 40% or greater. Further, with respect to the person determination result, similar to the first embodiment, the user selection standard may be estimated on the basis of a ratio of a user-selected person to a total number of user-selected images 202A including persons, among the user-selected images 202A.

Further, without using the object determination result, the user selection standard may be estimated in a case where the user selection ratio to the non-selected images is equal to or greater than a predetermined threshold value, on the basis of the attribute information such as the degree of blurring/camera-shake, the degree of brightness, the color, and the like.

Specific Example of Selection Process in Automatic Selection Step

FIG. 11 is a schematic diagram showing an example of analysis results of non-selected images. In the analysis of the non-selected images, attribute information is assigned to the non-selected images 202B for the same type of attribute as in the user-selected images 202A, similar to the first embodiment. Further, similar to the first embodiment, the standard score is calculated for each of the non-selected images 202B using the attribute information. Note that illustration of the standard score of the non-selected images 202B is omitted.

In the automatic selection of the non-selected images 202B, a negative adjustment value is calculated as a negative weight on the basis of the user selection standard with which the user does not want to include a certain image in the photo album, and the standard score is adjusted using the negative adjustment value to calculate an adjusted score. A prescribed number of auto-selected images may be selected in a descending order of the adjusted scores.

FIG. 12 is a diagram illustrating adjusted scores. In a case where a user selection standard with which the user does not want to include an image in which an object includes food in the photo album is estimated, a non-selected image 202B having a file name 0011.xxx is assigned an adjustment value −300 as a negative weight to calculate an adjusted score.

FIG. 13 is a diagram illustrating another example of adjusted scores. In a case where a user selection standard with which the user does not want to include an image in which an object includes a person A in the photo album is estimated, a non-selected image 202B having a file name 0010.xxx and a non-selected image 202B having a file name 0013.xxx are assigned an adjustment value −300 as a negative weight to calculate adjusted scores.

That is, the adjusted score is calculated by applying a negative weight to the standard score for each of the non-selected images 202B on the basis of the user selection standards with which the user does not want to include a certain image in the photo album. A prescribed number of auto-selected images may be selected from the non-selected images 202B in a descending order of the adjusted scores calculated for the respective non-selected images 202B.

Operational Effects of Second Embodiment

According to the image processing apparatus and the image processing method of the second embodiment, the following operational effects may be obtained.

[1]

The user-selected images 202A manually selected by the user as images that the user does not want to include in the photo album are analyzed, and the user selection standard of the images that the user does not want to include in the photo album are estimated. The images estimated on the basis of the estimated user selection standard are excluded from the non-selected images 202B, so that the auto-selected images are selected from the non-selected images 202B. Thus, it is possible to perform an automatic layout of a photo album using the user-selected images and the auto-selected images.

[2]

The standard scores of the non-selected images 202B are calculated on the basis of the attribute information. The standard score is adjusted using a negative weight based on the user selection standard with which the user does not want to include an image in the photo album to calculate the adjusted score. Thus, it is possible to automatically select images to be used for the photo album in a descending order of the adjusted scores.

Third Embodiment

Overall Configuration of Image Processing Apparatus

Next, an image processing apparatus according to a third embodiment will be described. In the following description, differences from the image processing apparatus 10 according to the first embodiment will be mainly described. An overall configuration of the image processing apparatus according to the second embodiment will be described with reference to FIG. 2.

The image processing apparatus according to the third embodiment retains display non-selected image information that is information of display non-selected images displayed on a selection screen, among non-selected images that are not selected by a user in selecting user-selected images, estimates user display non-selection standard using the display non-selected image information, and reinforces estimation of a user selection standard.

The user selection information acquisition section 54 shown in FIG. 2 acquires user selection information, and acquires display non-selected image information. Examples of the display non-selected image information include a file name of a display non-selected image, a positional relationship with a user-selected image on a selection screen, a display period on the selection screen, and the like.

The standard estimation section 60 estimates a user display non-selection standard indicating a user's intention of non-selection from the display non-selected image information. Using the estimated user display non-selection standard, the user's intention of non-selecting a display non-selected image is considered, and thus, the estimation of the user selection standard is reinforced.

Procedure of Image Processing Method

In the user selection information acquisition step S14 shown in FIG. 3, the user selection information is acquired, and the display non-selected image information is acquired. In the user-selected image analysis step S16, the non-display selection information regarding the display non-selected images is acquired, the user display non-selection standard indicating the user's intention of non-selection is estimated on the basis of the analysis result of the display non-selected images, the user's intention of non-selecting the display non-selected images is considered using the estimated user display non-selection standard, and the estimation of the user selection standard is reinforced.

Configuration Example of Selection Screen

Figure 14:
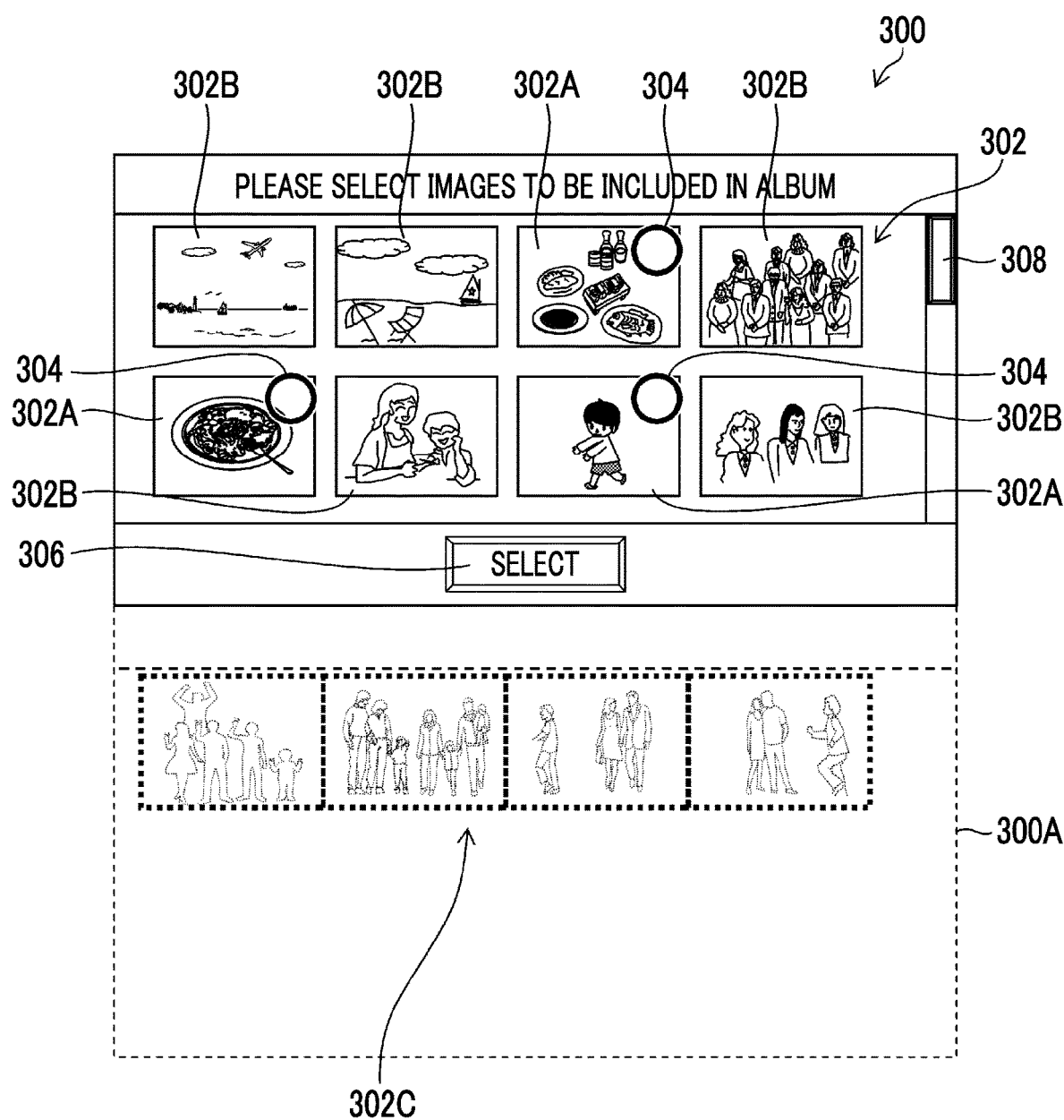
FIG. 14 is a schematic diagram of a selection screen applied to an image processing apparatus according to a third embodiment.

FIG. 14 is a schematic diagram of a selection screen applied to the image processing apparatus according to the third embodiment. A non-display area 300A is an area in which non-display candidate images 302C that are not to be displayed on a selection screen 300 are disposed, and represents an area that may be displayed on the selection screen 300 in a case where a scroll bar 308 is operated. The non-display candidate images 302C may be selected as the user-selected images 302A in a case of being displayed on the selection screen 300. Standard numeral 302 indicates a candidate image. Standard numeral 302B indicates a display non-selected image. Standard numeral 304 indicates a select symbol. Standard numeral 306 indicates a select button.

Preferences of Users Estimated from Display Non-Selected Images

FIG. 15 is a diagram illustrating a user's preference or the like estimated from display non-selected images. FIG. 15 illustrates, as non-selected image information, a display period on the selection screen 300, a positional relationship with the user-selected image 302A on the selection screen 300, and the degree of similarity to the user-selected image 302A.

As for the positional relationship with the user-selected image 302A on the selection screen 300, a distance therebetween may be applied using a numerical value such as the number of pixels. As for the degree of similarity to the user-selected image 302A, a numerical value such as a ratio may be applied.

Further, FIG. 15 shows an estimation result of a user's intention of non-selecting the display non-selected images 302B. For example, the display non-selected image 302B having a relatively short display period on the selection screen 300 is not nearly visually recognized by, for example, passing a user's visual range in scrolling the selection screen 300 in the course of user's search for the user-selected image 302A, and thus, may be estimated as an image for which there is no intention of non-selection.

On the other hand, the display non-selected image 302B having a relatively long display period on the selection screen 300, a relatively close positional relationship with the user-selected image 302A on the selection screen 300, and a relatively high degree of similarity to the user-selected image 302A may be estimated as an image that is visually recognized by the user but is not selected. That is, it may be estimated as an image that the user does not want to select.

The display non-selected image 302B having a relatively long display period on the selection screen 300, a relatively close positional relationship with the user-selected image 302A on the selection screen 300, and a relatively high degree of similarity may be estimated as an image that is visually recognized by the user but is suspended in selection due to similarity to the user-selected image 302A.

As shown in FIG. 15, a negative adjustment value for adjusting the standard score is assigned to the estimation result of the user's non-selection intention in the display non-selected image 302B, and an adjusted score obtained by adjusting the standard score calculated for each display non-selected image 302B using the adjustment value may be calculated. The negative adjustment value based on the estimation result of the user's non-selection intention is a negative weight with respect to the standard score.

In a case where the weight based on the user selection standard is a negative weight, the weight based on the user display non-selection standard is a positive weight. That is, in a case where the weight based on the user selection standard is any one of the positive weight or the negative weight, the weight based on the user display non-selection standard is the other of the positive weight or the negative weight.

In the present embodiment, as for the display non-selected image 302B, the user display non-selection standard is estimated on the basis of at least one of the display period, the display positional relationship with the selection image, or the degree of similarity, and the adjustment value is set on the basis of the estimated user display non-selection standard, the present disclosure is not limited thereto.

The display non-selected image may be determined as the user-selected image 202A (second user-selected image) of the second embodiment, and similar to the second embodiment, a ratio of the display non-selected images 302B for each attribute to a total number of the display non-selected images 302B is determined as a user selection ratio (second user selection ratio), and a user selection standard (second user selection standard) indicating an image that is not to be used for the photo album may be estimated on the basis of the ratio of the display non-selected images 302B.

Further, an image that satisfies a predetermined condition, among the display non-selected images 302B, for example, only an image that the user does not want to select in FIG. 15 may be determined as the user-selected image of the second embodiment (second user-selected image), and the similar processes as in the second embodiment may be performed.

Specific Example of Selection Process in Automatic Selection Step

FIG. 16 is a diagram showing an example of standard scores. Calculation of the standard score for each display non-selected image 302B shown in the figure is the same as in the first and second embodiments. Thus, description thereof will not be repeated.

FIG. 17 is a diagram illustrating adjusted scores. The adjusted scores shown in FIG. 17 are calculated by considering the adjustment values shown in FIG. 15 with respect to the adjusted scores shown in FIG. 7. The display non-selected image 302B having a file name 0011.xxx is assigned an adjustment value +300 corresponding to a user selection standard with which the user wants to select an image including food in an object.

On the other hand, the display non-selected image 302B having the file name 0011.xxx is assigned an adjustment value −300 corresponding to a user's non-selection intention. Adjusted scores are calculated by performing adjustment using the adjustment values for the standard scores.

Operational Effects of Third Embodiment

According to the image processing apparatus and the image processing method of the third embodiment, the following operational effects may be obtained.

[1]

The user's non-selection intention is estimated from the display non-selected images 302B that is displayed on the selection screen 300 but is not to be selected by the user. Thus, in a case where the auto-selected images are selected from the non-selected images, the user's non-selection intention for each non-selected image may be taken into consideration.

[2]

The display non-selected image 302B is assigned an adjustment value as a negative weight corresponding to the user's non-selection intention, and a corrected score is calculated by correcting the standard score using the adjustment value. Thus, in a case where a prescribed number of auto-selected images are selected in a descending order of the corrected scores, the user's non-selection intention for each display non-selected image 302B may be taken into consideration.

Combination of Embodiments

The first embodiment, the second embodiment, and the third embodiment may be combined in an appropriate manner. For example, the second embodiment may be combined with the first embodiment.

That is, in a case where the user manually selects the user-selected images 102A from the candidate images 102 shown in FIG. 4, the user may manually select the user-selected image 202A that the user does not want to include in the photo album shown in FIG. 9.

Auto-selected images corresponding to a user's preference or the like may be selected from candidate images using the user selection standard estimated on the basis of the user-selected images 102A and the user selection standard estimated on the basis of the user-selected images 202A.

In calculating the adjusted score for the non-selected image, a positive weight calculated on the basis of the user selection standard estimated on the basis of the user-selected images 102A may be applied, and a negative weight calculated on the basis of the user selection standard estimated on the basis of the user-selected images 202A may be applied.

Further, the third embodiment may be combined with the second embodiment. That is, in the third embodiment, the user selection standard is estimated on the basis of the user-selected images 302A selected by the user as images to be used for the photo album from the candidate images 302 shown in FIG. 14, and the user display non-selection standard indicating the user's intention of non-use for the photo album is estimated from the display non-selected images 302B.

In the third embodiment, the user selection standard may be estimated on the basis of the user-selected images that are selected by the user from the candidate images 302 as images that are not to be used for the photo album, and the user display non-selection standard indicating the user's intention of use for the photo album may be estimated from the display non-selected images 302B.

In other words, in the second embodiment, similar to the third embodiment, the user display non-selection standard is estimated from the display non-selected image on the basis of the positional relationship between the display non-selected image and the user-selected image, the display period of the display non-selected image, and the like, a negative weight calculated on the basis of the user selection standard estimated on the basis of the user-selected images 202A shown in FIG. 9 may be applied, and a positive weight calculated on the basis of the user display non-selection standard estimated on the basis of the user display non-selected images may be applied.

Hardware Configuration of Each Processing Unit and Control Unit

A hardware structure of the processing units that executes the processes of the image processing apparatus 10 and the image processing unit 12 described in the above embodiments includes various processors. The various processors include a central processing unit (CPU), a programmable logic device (PLD), an application specific integrated circuit (ASIC), and the like.

The CPU is a general-purpose processor that executes a program to function as various processing units. The PLD is a processor whose circuit configuration is changeable after manufacturing. As an example of the PLD, a field programmable gate array (FPGA) may be used. The ASIC is a dedicated electrical circuitry having a circuit configuration specifically designed to execute a specific process.

One processing unit may be configured by one of these various processors, or may be configured by two or more processors of the same type or different types. For example, one processing unit may be configured using a plurality of FPGAs or the like. One processing unit may be configured by combining one or more FPGAs and one or more CPUs.

Further, a plurality of processing units may be configured using one processor. As an example in which the plurality of processing units are configured using one processor, there is a form in which one processor is configured by combining one or more CPUs and software and one processor functions as the plurality of processing units. Such a form is represented by a computer such as a client terminal device and a server device.

As another configuration example is as follows. That is, a form in which a processor that realizes entire functions of a system including a plurality of processing units using one IC chip is used may be employed. Such an example is represented by a System On Chip. Note that IC is an abbreviation for Integrated Circuit. Further, the System On Chip may be expressed as SoC using an abbreviation of System On Chip.

As described above, the various processing units are configured using one or more of the various processors described above as the hardware structure. Further, more specifically, the hardware structure of the various processors is an electrical circuitry in which circuit elements such as semiconductor elements are combined.

Example of Application to Program

A program that causes a computer to realize various functions of the image processing apparatus and respective steps of the image processing method described in this specification may be configured. For example, a program that causes a computer to realize processes corresponding to the specification information acquisition section 50, the image acquisition section 52, the user selection information acquisition section 54, the analysis section 56, the attribute information assigning section 58, the standard estimation section 60, the automatic selection section 62, the layout section 64, and the order information transmitting section 66 shown in FIG. 2 may be configured.

Example of Application to Network System

The image processing apparatus 10 shown in FIG. 1 may be configured using a system in which a plurality of independent devices are connected to each other. For example, the image processing apparatus 10 may be configured using a network system in which a plurality of computers are connected to each other through a network. The plurality of computers may be applied to a server device and a client device that are connected each other through a network so as to allow data communication. Further, cloud computing may be applied to the system described above.

For example, the image processing apparatus 10 may configure an entire system including a terminal device having the display unit 14 and the input unit 16, an image processing server device having the image processing unit 12 except for the memory 22, and a storage server device having the memory 22 and the storage unit 18. Furthermore, the image processing apparatus 10 may configure only an image processing server in the above-described system.

For example, the above-described image processing apparatus may be mounted on a server device, images owned by a user may be uploaded from a client device, various processes may be performed using the server device, and its processing result may be transmitted from the server device to the client device. The number of server devices is not limited to one. Various processes may be realized using a plurality of server devices.

In the embodiments of the present disclosure described above, appropriate modifications, additions, or deletions of the components may be made without departing from the concept of the present disclosure. The present disclosure is not limited to the embodiments described above, and various modifications may be made by those skilled in the art within the technical scope of the present disclosure. In addition, the embodiments, modified examples, and application examples may be appropriately combined and realized.

Other Aspects of the Present Disclosure

According to another aspect of the present disclosure, in the image processing apparatus, the processor calculates a standard score on the basis of an evaluation value of the assigned attribute for the non-selected image, calculates an adjusted score obtained by adjusting the standard score using a weight corresponding to the user selection standard, and selects the auto-selected image from the non-selected image in a descending order of the adjusted score.

According to this aspect of the present disclosure, it is possible to automatically select the non-selected image according to the weight corresponding to the user selection standard.

According to still another aspect of the present disclosure, in the image processing apparatus, the processor acquires first user selection information regarding a first user-selected image selected by the user from the candidate images as an image to be used for a photo album, estimates a first user selection standard corresponding to the image to be used for the photo album as the user selection standard on the basis of an analysis result of the first user-selected image, and selects the auto-selected image that is the image to be used for the photo album from the non-selected image on the basis of the first user selection standard.

According to this aspect of the present disclosure, it is possible to automatically select the non-selected image on the basis of the first user selection standard estimated on the basis of the image that the user wants to use for the photo album.

According to still another aspect of the present disclosure, in the image processing apparatus, the processor preferentially selects the non-selected image having an attribute such that a first user selection ratio that is a basis of the first user selection standard is relatively high as the auto-selected image.

According to this aspect of the present disclosure, it is possible to preferentially select the non-selected image having an attribute with a high first user selection ratio.

According to still another aspect of the present disclosure, in the image processing apparatus, the processor calculates a standard score on the basis of an evaluation value of the assigned attribute for the non-selected image, calculates an adjusted score obtained by adjusting the standard score using a positive weight corresponding to the first user selection standard, and selects the auto-selected image from the non-selected image in a descending order of the adjusted score.

According to this aspect of the present disclosure, it is possible to automatically select the non-selected image according to the weight corresponding to the user selection standard. Further, it is possible to automatically select the non-selected image on the basis of the image that the user wants to use for the photo album.

According to still another aspect of the present disclosure, in the image processing apparatus, the processor acquires second user selection information regarding a second user-selected image selected as an image that is not to be used for a photo album by the user from the candidate images, estimates a second user selection standard corresponding to the image that is not to be used for the photo album as the user selection standard, on the basis of an analysis result of the second user-selected image, and selects the auto-selected image from the non-selected image by excluding the image that is not to be used for the photo album from the non-selected image, on the basis of the second user selection standard.

According to this aspect of the present disclosure, it is possible to automatically select the non-selected image by excluding the image that is not to be used for the photo album from the non-selected image, on the basis of the second user selection standard estimated on the basis of the image that is not to be used for the photo album selected by the user.

According to still another aspect of the present disclosure, in the image processing apparatus, the processor preferentially excludes the non-selected image having an attribute such that a second user selection ratio that is a basis of the second user selection standard is relatively high as the auto-selected image.

According to this aspect of the present disclosure, it is possible to preferentially exclude the non-selected image having an attribute with a high second user selection ratio.

According to still another aspect of the present disclosure, in the image processing apparatus, the processor calculates a standard score on the basis of an evaluation value of the assigned attribute for the non-selected image, calculates an adjusted score obtained by adjusting the standard score using a negative weight corresponding to the second user selection standard, and selects the auto-selected image from the non-selected image in a descending order of the adjusted score.

According to this aspect of the present disclosure, it is possible to automatically select the non-selected image by excluding a target image from the non-selected image, on the basis of the image that is not to be used for the photo album selected by the user.

According to still another aspect of the present disclosure, in the image processing apparatus, the processor causes a display unit to display at least a part of the candidate images as display candidate images, acquires non-display selection information regarding a display non-selected image that is an image that is not selected by the user, among the display candidate images, estimates a user display non-selection standard on the basis of an analysis result of the display non-selected image, and selects the auto-selected image from the non-selected image that is not selected by the user in the candidate images, on the basis of the user selection standard and the user display non-selection standard.

According to this aspect of the present disclosure, it is possible to improve the accuracy in automatic selection of a non-selected image that reflects the user's preference or the like.

According to still another aspect of the present disclosure, in the image processing apparatus, the processor calculates a standard score on the basis of an evaluation value of the assigned attribute for the non-selected image, calculates an adjusted score obtained by adjusting the standard score using a weight corresponding to the user selection standard and the user display non-selection standard, and selects the auto-selected image from the non-selected image in a descending order of the adjusted score. In a case where the weight corresponding to the user selection standard is any one of a positive weight or a negative weight, the weight corresponding to the user display non-selection standard is the other one of the positive weight or the negative weight.

According to this aspect of the present disclosure, it is possible to automatically select the non-selected image according to the weight corresponding to the display non-selection standard.

According to still another aspect of the present disclosure, in the image processing apparatus, the processor sets at least one of information regarding an object of the user-selected image, information regarding a degree of focus of the user-selected image, information regarding a degree of brightness of the user-selected image, or information regarding a color of the user-selected image as an attribute, and assigns attribute information to the user-selected image.

According to this aspect of the present disclosure, it is possible to apply at least one of the information regarding the object of the selected image, the information regarding the degree of focus of the selected image, the information regarding the degree of brightness of the selected image, or the information regarding the color of the selected image as the attribute information of the image.

According to still another aspect of the present disclosure, in the image processing apparatus, the processor acquires first user selection information regarding a first user-selected image selected by the user from the candidate images as an image to be used for the photo album and second user selection information regarding a second user-selected image selected as an image that is not to be used for the photo album by the user from the candidate images, estimates a first user selection standard corresponding to the image to be used for the photo album and a second user selection standard corresponding to the image that is not to be used for the photo album, as the user selection standard, on the basis of analysis results of the first user-selected image and the second user-selected image, and selects the auto-selected image that is an image to be used for the photo album from the non-selected image on the basis of the first user selection standard by excluding the image that is not to be used for the photo album from the non-selected image on the basis of the second user selection standard.

According to this aspect of the present disclosure, it is possible to automatically select the non-selected image on the basis of the first user selection standard estimated on the basis of the image that the user wants to use for the photo album. Further, it is possible to automatically select the non-selected image by excluding the image that is not to be used for the photo album from the non-selected image, on the basis of the second user selection standard estimated on the basis of the image that is not to be used for the photo album selected by the user.

According to still another aspect of the present disclosure, in the image processing apparatus, the processor calculates a standard score for a non-selected image based on an evaluation value of an assigned attribute, calculates an adjusted score obtained by adjusting the standard score using a positive weight corresponding to the first user selection standard and a negative weight corresponding to the second user selection standard, and selects the auto-selected image from the non-selected image in a descending order of the adjusted score.

According to this aspect of the present disclosure, it is possible to automatically select the non-selected image according to the weight corresponding to the user selection standard.

EXPLANATION OF REFERENCES

10: image processing apparatus
12: image processing unit
14: display unit
16: input unit
18: storage unit
20: processor
22: memory
24: image memory
26: information memory
28: program memory
30: communication interface
32: input/output interface
40: display driver
42: input driver
44: storage driver
50: specification information acquisition section
52: image acquisition section
54: user selection information acquisition section
56: analysis section
58: attribute information assigning section
60: standard estimation section
62: automatic selection section
64: layout section
66: order information transmitting section
100: selection screen
102: candidate image
102A: user-selected image
104: select symbol
106: select button
108: scroll bar
200: selection screen
202: candidate image
202A: user-selected image
202B: non-selected image
204: negative select symbol
206: select button
208: scroll bar
300: selection screen
300A: non-display area
302: candidate image
302A: user-selected image
302B: display non-selected image
302C: non-display candidate image
304: select symbol
306: select button
308: scroll bar
S10 to S24: each step of image processing method

What is claimed is:

1. An image processing apparatus comprising at least one processor configured to:
   acquire a plurality of candidate images;
   acquire user selection information regarding user-selected images that have been selected by a user from the plurality of acquired candidate images;
   assign an attribute to each user-selected image on the basis of an analysis result of the user-selected image, the attribute indicating whether a specific person is included in the user-selected image;
   estimate a user selection standard that is a standard in selecting the user-selected images on the basis of a user selection ratio represented by a ratio of a number of the user-selected images that have been assigned the same attribute to a number of the user-selected images that include at least one person; and
   select, on the basis of the estimated user selection standard, an auto-selected image from non-selected images that have not been selected by the user in the candidate images,
   wherein the user selected images that include at least one person is a subset of all of the user selected images.

2. The image processing apparatus according to claim 1, wherein the processor is configured to:
   calculate a standard score for each non-selected image on the basis of an evaluation value of an attribute assigned to the non-selected image;
   calculate an adjusted score for each non-selected image obtained by adjusting the standard score using a weight corresponding to the user selection standard; and
   select the auto-selected image from the non-selected images in a descending order of the adjusted score.

3. The image processing apparatus according to claim 1, wherein the processor is configured to:
   acquire first user selection information regarding a first user-selected image that has been selected as an image to be used for a photo album by the user from the candidate images;
   estimate a first user selection standard corresponding to the image to be used for the photo album as the user selection standard on the basis of an analysis result of the first user-selected image; and
   select the auto-selected image that is to be used for the photo album from the non-selected images on the basis of the first user selection standard.

4. The image processing apparatus according to claim 3, wherein the processor is configured to preferentially select, as the auto-selected image, the non-selected image that has been assigned the attribute of which a first user selection ratio is relatively high, the first user selection ratio being a basis of the first user selection standard.

5. The image processing apparatus according to claim 3, wherein the processor is configured to:
   calculate a standard score for each non-selected image on the basis of an evaluation value of an attribute assigned to the non-selected image;
   calculate an adjusted score for each non-selected image obtained by adjusting the standard score using a positive weight corresponding to the first user selection standard; and
   select the auto-selected image from the non-selected images in a descending order of the adjusted score.

6. The image processing apparatus according to claim 1, wherein the processor is configured to:
   acquire second user selection information regarding a second user-selected image that has been selected as an excluded image that is not to be used for a photo album by the user from the candidate images;
   estimate a second user selection standard corresponding to the excluded image that is not to be used for the photo album as the user selection standard on the basis of an analysis result of the second user-selected image; and
   select the auto-selected image that is to be used for the photo album from the non-selected images by excluding an auto-excluded image that is not to be used for the photo album from the non-selected images on the basis of the second user selection standard.

7. The image processing apparatus according to claim 6, wherein the processor is configured to preferentially excludes, as the auto-excluded image, the non-selected image that has been assigned the attribute of which a second user selection ratio is relatively high, the second user selection ratio being a basis of the second user selection standard.

8. The image processing apparatus according to claim 6, wherein the processor is configured to:
   calculate a standard score for each non-selected image on the basis of an evaluation value of an attribute assigned to the non-selected image;
   calculate an adjusted score for each non-selected image obtained by adjusting the standard score using a negative weight corresponding to the second user selection standard; and
   select the auto-selected image from the non-selected images in a descending order of the adjusted score.

9. The image processing apparatus according to claim 1, wherein the processor is configured to:
   cause a display to display at least a part of the candidate images as display candidate images;
   acquire non-display selection information regarding a display non-selected image that has not been selected by the user to be displayed on the display, among the display candidate images,
   estimate a user display non-selection standard on the basis of an analysis result of the display non-selected image; and
   select the auto-selected image from the non-selected images on the basis of the user selection standard and the user display non-selection standard.

10. The image processing apparatus according to claim 9, wherein the processor is configured to:
    calculate a standard score for each non-selected image on the basis of an evaluation value of an attribute assigned to the non-selected image;
    calculate an adjusted score for each non-selected image obtained by adjusting the standard score using a weight corresponding to the user selection standard and a weight corresponding to the user display non-selection standard; and
    select the auto-selected image from the non-selected images in a descending order of the adjusted score,
    wherein in a case where the weight corresponding to the user selection standard is one of a positive weight and a negative weight, the weight corresponding to the user display non-selection standard is the other one of the positive weight and the negative weight.

11. The image processing apparatus according to claim 1, wherein the processor is configured to:
    set, as the attribute, at least one of information regarding an object of the user-selected image, information regarding a degree of focus of the user-selected image, information regarding a degree of brightness of the user-selected image, and information regarding a color of the user-selected image; and assign the set attribute to each user-selected image.

12. An image processing method comprising:

acquiring a plurality of candidate images;

acquiring user selection information regarding user-selected images that have been selected by a user from the plurality of acquired candidate images;

assigning an attribute to each user-selected image on the basis of an analysis result of the user-selected image, the attribute indicating whether a specific person is included in the user-selected image;

estimating a user selection standard that is a standard in selecting the user-selected images on the basis of a user selection ratio represented by a ratio of a number of the user-selected images that have been assigned the same attribute to a number of the user-selected images that include at least one person; and selecting, on the basis of the estimated user selection standard, an auto-selected image from non-selected images that have not been selected by the user in the candidate images, wherein the user selected images that include at least one person is a subset of all of the user selected images.

13. A non-transitory, tangible computer-readable recording medium which records thereon a program causing a computer, when read by the computer, to execute:

a process of acquiring a plurality of candidate images;

a process of acquiring user selection information regarding user-selected images that have been selected by a user from the plurality of acquired candidate images;

a process of assigning an attribute to each user-selected image on the basis of an analysis result of the user-selected image, the attribute indicating whether a specific person is included in the user-selected image;

a process of estimating a user selection standard that is a standard in selecting the user-selected images on the basis of a user selection ratio represented by a ratio of a number of the user-selected images that have been assigned the same attribute to a number of the user-selected images that include at least one person; and a process of selecting, on the basis of the estimated user selection standard, an auto-selected image from non-selected images that have not been selected by the user in the candidate images, wherein the user selected images that include at least one person is a subset of all of the user selected images.

14. An image processing apparatus comprising at least one processor configured to:

acquire a plurality of candidate images;

acquire user selection information regarding user-selected images that have been selected by a user from the plurality of acquired candidate images;

assign an attribute to each user-selected image on the basis of an analysis result of the user-selected image, the attribute indicating whether a specific person is included in the user-selected image;

estimate a user selection standard that is a standard in selecting the user-selected images on the basis of a user selection ratio represented by a ratio of a number of the user-selected images that have been assigned the same attribute to a number of the user-selected images that include at least one person;

select, on the basis of the estimated user selection standard, an auto-selected image from non-selected images that have not been selected by the user in the candidate images;

calculate a standard score for each non-selected image on the basis of an evaluation value of an attribute assigned to the non-selected image;

calculate an adjusted score for each non-selected image obtained by adjusting the standard score using a weight corresponding to the user selection standard;

select the auto-selected image from the non-selected images in a descending order of the adjusted score; and lay out, on a page of a photo album, the user-selected images preferentially with respect to the auto-selected image, wherein the user selected images that include at least one person is a subset of all of the user selected images.

15. An image processing method comprising:

acquiring a plurality of candidate images;

acquiring user selection information regarding user-selected images that have been selected by a user from the plurality of acquired candidate images;

assigning an attribute to each user-selected image on the basis of an analysis result of the user-selected image, the attribute indicating whether a specific person is included in the user-selected image;

estimating a user selection standard that is a standard in selecting the user-selected images on the basis of a user selection ratio represented by a ratio of a number of the user-selected images that have been assigned the same attribute to a number of the user-selected images that include at least one person;

selecting, on the basis of the estimated user selection standard, an auto-selected image from non-selected images that have not been selected by the user in the candidate images;

calculating a standard score for each non-selected image on the basis of an evaluation value of an attribute assigned to the non-selected image;

calculating an adjusted score for each non-selected image obtained by adjusting the standard score using a weight corresponding to the user selection standard;

selecting the auto-selected image from the non-selected images in a descending order of the adjusted score; and laying out, on a page of a photo album, the user-selected images preferentially with respect to the auto-selected image, wherein the user selected images that include at least one person is a subset of all of the user selected images.

16. A non-transitory, tangible computer-readable recording medium which records thereon a program causing a computer, when read by the computer, to execute:

a process of acquiring a plurality of candidate images;

a process of acquiring user selection information regarding user-selected images that have been selected by a user from the plurality of acquired candidate images;

a process of assigning an attribute to each user-selected image on the basis of an analysis result of the user-selected image, the attribute indicating whether a specific person is included in the user-selected image;

a process of estimating a user selection standard that is a standard in selecting the user-selected images on the basis of a user selection ratio represented by a ratio of a number of the user-selected images that have been assigned the same attribute to a number of the user-selected images that include at least one person;

a process of selecting, on the basis of the estimated user selection standard, an auto-selected image from non-selected images that have not been selected by the user in the candidate images;

a process of calculating a standard score for each non-selected image on the basis of an evaluation value of an attribute assigned to the non-selected image;

a process of calculating an adjusted score for each non-selected image obtained by adjusting the standard score using a weight corresponding to the user selection standard;

a process of selecting the auto-selected image from the non-selected images in a descending order of the adjusted score; and a process of laying out, on a page of a photo album, the user-selected images preferentially with respect to the auto-selected image, wherein the user selected images that include at least one person is a subset of all of the user selected images.

* * * * *